3,850,982
DICARBOXYLIC ACID PURIFICATION PROCESS

Richard V. Norton, Wilmington, Del., assignor to Sun Research and Development Co., St. Davids, Pa.
No Drawing. Filed Jan. 15, 1973, Ser. No. 323,478
Int. Cl. C07c 63/14, 63/38, 51/42
U.S. Cl. 260—525                                          8 Claims

ABSTRACT OF THE DISCLOSURE

A process for purifying a phthalic acid or a naphthalene dicarboxylic acid which contains an imide or imide precursor impurity by contacting said impure acid with an alkyl-substituted aromatic hydrocarbon or partially reduced aromatic hydrocarbon at a temperature between about 130° C. and about 210° C., and separating purified dicarboxylic acid from the solution of said imide impurity in said hydrocarbon.

---

Aromatic dicarboxylic acids such as isophthalic acid, terephthalic acid, 1,5-naphthalene dicarboxylic acid, 2,6-naphthalene dicarboxylic acid are useful intermediates for the preparation of linear polymers valuable as films, fibers and the like. These intermediates must be exceptionally free of impurities which are colored, which may become colored, or which can act as chain terminators in the polymerization step thereby causing low quality polymers to be obtained. These impurities arise during the preparation of the dicarboxylic acid from the starting hydrocarbon (e.g., m- or p-xylene, 2,6-dimethyl naphthalene, etc.). When the dicarboxylic acid is prepared by ammoxidation of the hydrocarbon followed by hydrolysis of the nitrile formed, an impurity in the acid product is frequently an imide or an imide precursor due to the presence of ortho isomers or peri isomers in the starting alkyl-substituted hydrocarbon. Thus, for example, when p-xylene is reacted with ammonia in a vapor phase ammoxidation procedure using a vanadium oxide catalyst (e.g., as disclosed in U.S. 2,846,462) and the terephthalonitrile formed is hydrolyzed to the desired terephthalic acid, the product contains phthalimide and other impurities such as the monoammonium salt of phthalic acid, diammonium phthalate, ammonium o-cyanobenzoate, and o-cyanobenzoic acid. Likewise, these impurities are present when other xylene isomers are ammoxidized and the nitrile hydrolyzed and similar impurities are present when starting with naphthalene compounds. These impurities must be removed and the process of this invention provides an economical and efficient purification method.

In accord with the invention, there is provided a process for purifying benzene and naphthalene dicarboxylic acids containing an imide or imide precursor by contacting said impure acid with an alkyl-substituted aromatic hydrocarbon or a partially hydrogenated aromatic hydrocarbon to a temperature between about 130° C. and 210° C. whereby imide precursors are converted to imides and said imides are solubilized, and separating purified dicarboxylic acid from said imide solution.

It will be understood that various contacting techniques may be used in the process of the invention. Thus, for example, a slurry of the aromatic hydrocarbon or partially reduced hydrocarbon with the impure acid may be made at the elevated temperature and the slurry filtered to leave the purified acid as filter cake. Alternatively, a hot extraction technique, such as in a Soxhlet type extractor or its equivalent may be employed. Other techniques available to the art are, of course, also useful. The time of contacting is not critical and may vary from several minutes to several hours (e.g., about 3 minutes to about 2 hours) depending upon the particular amounts of materials processed, the technique employed, or other specific conditions which will dictate the time requirements.

As pointed out above, the dicarboxylic acids which may be purified by the process of the invention will be benzene and naphthalene dicarboxylic acids and will include phthalic acid, isophthalic acid, terephthalic acid, 1,5-naphthalene dicarboxylic acid, 2,6-naphthalene dicarboxylic acid, and the like. The process is particularly advantageous, as explained above, with acids that are obtained by hydrolysis of nitriles made by ammoxidation since such acids will be most likely to contain the imide and imide precursor impurities. The imide precursors present in the acid are converted to imides by the process of the invention and this occurs by means of thermal reaction in accord with the following equations:

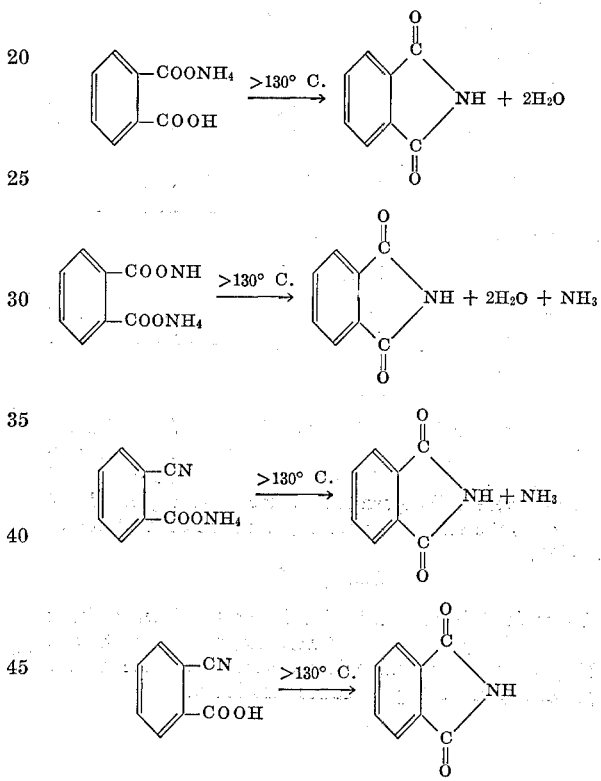

The solvents useful in the process of the invention will be liquid aromatic hydrocarbons containing from about 7 to about 12 carbon atoms such as alkyl-substituted aromatic hydrocarbons (preferably alkyl-substituted benzenes) and partially hydrogenated aromatic hydrocarbons (preferably partilaly hydrogenated naphthalene). Specific examples of useful solvents are toluene, the xylene isomers, ethylbenzene, mono- and dimethylnaphthalene, cumene, diethylbenzene isomers, tetralin, and the like.

The temperature of the process will be carried out at a temperature of from about 130° C. to about 210° C. Temperatures below about 130° C. result in both inefficient pyrolysis of the imide precursors to imide and also in poor extraction. Thus, this lower temperature limit is a critical parameter of the process. On the other hand, temperatures above about 210° C. are operable, but generally require more expensive pressure equipment and thus lead to a process of lower economy. Preferably, the process will be operated with xylenes over a temperature of from about 140° C. to about 150° C. or with tetralin at about 180° to about 200° C.

It will be understood that the purified acid may be separated from the hydrocarbon by any conventional technique. Where an extraction process of the impure acid is employed and the imide solution is no longer in contact with the acid, all that is required is that the solvent hydrocarbon contacting the acid be removed by evaporation. Where contacting the acid is carried out under slurry conditions, a filtering step is first used to remove the acid from the imide solution. Other techniques will be obvious to the skilled art worker.

In order to further describe the invention, the following examples are given:

Example 1

A slurry of isophthalic acid (15 parts) containing phthalimide (0.7 parts by weight) is mixed for about 5 minutes at 137° C. with mixed xylene (86 parts) and then filtered. Evaporation of the xylene filtrate yielded 0.65 parts of phthalimide indicating a 92% purification efficiency.

Example 2

Purification of terephthalic acid (25 parts) made by an ammoxidation procedure and containing phthalimide (2 parts) is accomplished by heating its slurry in p-xylene at 140° for 5 minutes and then filtering. The terephthalic acid remaining as filter cake contained less than 0.1 part of phthalimide, representing a purification efficiency of over 95%.

When the above procedure is repeated except that the temperature of heating is 110° C., a purification efficiency of less than 21% is obtained.

Example 3

Example 2 was repeated, but using ethylbenzene at 136° C. instead of p-xylene. The purification efficiency is about 80%.

Example 4

An ammoxidation product of 25 parts of terephthalic acid containing 2 parts of ammonium phthalate impurity is slurried in 95 parts p-xylene for one hour at 141° C. and filtered. Evaporation of the filtrate yielded 1.4 parts of phthalimide representing a purification efficiency of 95%.

Example 5

Example 4 is repeated with 25 parts of terephthalic acid containing 1.83 parts of monoammonium phthalate, 1.35 parts of phthalimide is recovered from the filtrate representing a 92% purification efficiency.

Example 6

A slurry of 25 parts of 2,6-naphthalene dicarboxylic acid containing 0.3 parts of 2,3-naphthalimide is heated for 20 minutes in Tetralin at 180° C. and filtered at 175° C. Evaporation of the Tetralin from the filtrate yielded 0.25 parts of naphthalimide, representing an 84% purification efficiency.

The invention claimed is:

1. A process for purifying a phthalic acid or a naphthalene dicarboxylic acid made by ammoxidation and subsequent hydrolysis which consists of contacting said acid at a temperature between about 130° to about 210° C. with an alkyl-substituted aromatic hydrocarbon or a partially reduced aromatic hydrocarbon, said hydrocarbons containing from 7 to about 12 carbon atoms, and separating purified dicarboxylic acid.

2. A process for purifying a phthalic acid or a naphthalene dicarboxylic acid made by ammoxidation and subsequent hydrolysis and which contains an imide or imide precursor as impurity which consists of contacting said impure acid at a temperature between about 130° to about 210° C. with an alkyl-substituted aromatic hydrocarbon containing from 7 to about 12 carbon atoms or a partially hydrogenated naphthalene, and separating purified dicarboxylic acid from the solution of said imide impurity in said hydrocarbon.

3. The process of Claim 2 where the acid is contacted with an alkyl-substituted hydrocarbon at about 140° C. to about 150° C.

4. The process of Claim 2 where the acid is a naphthalene dicarboxylic acid and is contacted with Tetralin at about 180° to about 200° C.

5. The process of Claim 3 where isophthalic acid is purified by contacting with mixed xylenes.

6. The process of Claim 3 where terephthalic acid is contacted with xylene.

7. The process of Claim 3 where terephthalic acid is contacted with ethylbenzene.

8. The process of Claim 4 where the acid is 2,6-naphthalene dicarboxylic acid.

References Cited
UNITED STATES PATENTS

| | | | |
|---|---|---|---|
| 3,624,145 | 11/1971 | Brinn | 260—525 |
| 3,646,125 | 2/1972 | Berthoux et al. | 260—525 |
| 3,711,539 | 1/1973 | Koch et al. | 260—525 |

LORRAINE A. WEINBERGER, Primary Examiner

R. D. KELLY, Assistant Examiner